United States Patent [19]

Kiehl et al.

[11] 4,168,888
[45] Sep. 25, 1979

[54] FILM CARTRIDGE

[75] Inventors: Paul G. Kiehl, St. Louis; George R. Pierson, Lemay, both of Mo.

[73] Assignee: Visual Data Corporation, Chesterfield, Mo.

[21] Appl. No.: 867,703

[22] Filed: Jan. 9, 1978

[51] Int. Cl.² .............. G03B 21/00; G02B 27/00
[52] U.S. Cl. .................. 353/122; 242/55.19 A; 352/78 R; 352/126; 350/241
[58] Field of Search ........... 242/55.19 A; 350/252, 350/257, 241, 236, 238; 353/26 R, 26 A, 43, 120, 122, DIG. 2; 352/78, 126, 128, 129; 40/364

[56] References Cited

U.S. PATENT DOCUMENTS

| | | | |
|---|---|---|---|
| 1,411,008 | 3/1922 | Fiske | 350/241 |
| 2,275,863 | 3/1942 | Rauch | 353/DIG. 2 |
| 2,495,047 | 1/1950 | Afton et al. | 350/238 |
| 3,446,551 | 5/1969 | Platt | 353/120 |
| 3,697,159 | 10/1972 | Fernkopf | 242/55.19 A |
| 4,073,581 | 2/1978 | Rayburn | 352/79 R |

FOREIGN PATENT DOCUMENTS 2054106  5/1971  Fed. Rep. of Germany ... 242/55.19 A

Primary Examiner—Richard E. Aegerter
Assistant Examiner—John W. Shepperd
Attorney, Agent, or Firm—Rogers, Eilers & Howell

[57] ABSTRACT

A film cassette for containing and displaying an endless loop of film has a housing constructed of two symmetrical elements, an end of the housing being deeper to accommodate a larger portion of the film. Apertures are formed in opposing sides of the housing and extend the full width of each side or approximately twice the width of a frame of film. A dual film gate assembly is contained within the housing and has two back plates to support the film and two snap on front plates which define a film gate on either side through which a leader of film is threaded. Both the back plates and the front plates have openings which approximate the size of a frame of film to allow light to pass from one aperture to the other in a straight line path. A film advancing means consists generally of a shaft having two sprockets mounted thereon, each sprocket extending through an index slot in a film guide plate and having teeth or other structure to positively engage the film and advance it through the film slot. The double sprockets operate to push and pull the film through the dual film gate and maintain the relative spacing between ends of the film. The film is presented in a direct view mode and a project mode simultaneously on opposite sides of the dual film gate assembly and is advanced simultaneously by the double sprocket film advancing means. Windows may be provided to seal the apertures to prevent contamination from entering the cassette. In an alternate embodiment, the apertures extend only halfway across the sides of the housing or approximately one full width of a frame of film. The film is threaded through similar internal structure but is displayed at only one aperture. In this mode, the cassette may be used for direct viewing in one orientation and turned upside down to achieve the proper film juxtaposition for projecting. Either a double or single sprocket drive may be provided in this embodiment. A direct viewer attachment may be provided and is pivotable from a stored position to an operating position. The direct viewer attachment has a small optical element which is positioned to align with the direct view display of the cassette. A snap on light unit may be provided for attaching to one side of the cassette to provide light for direct view operation.

28 Claims, 14 Drawing Figures

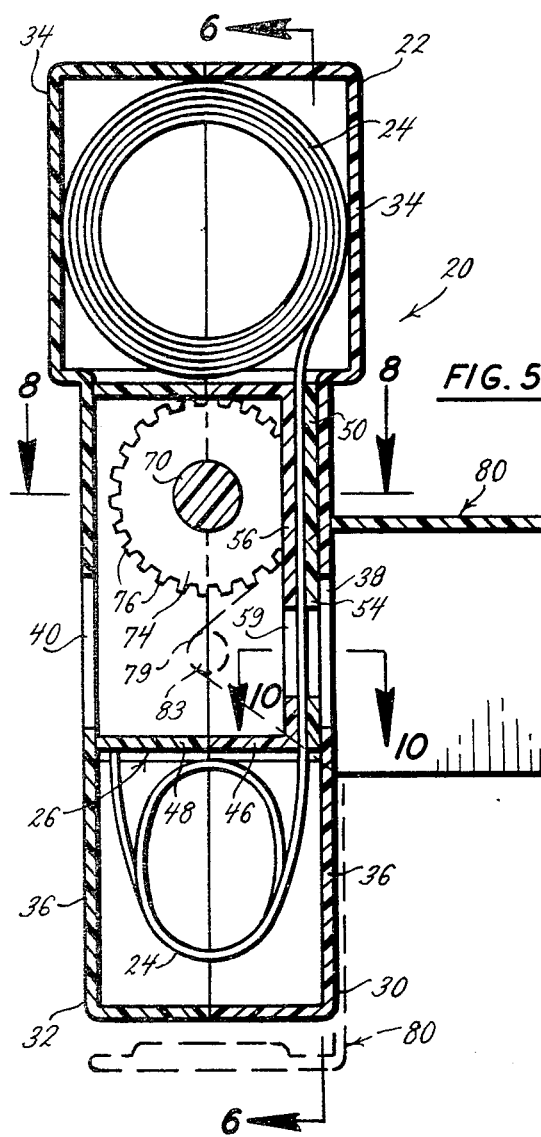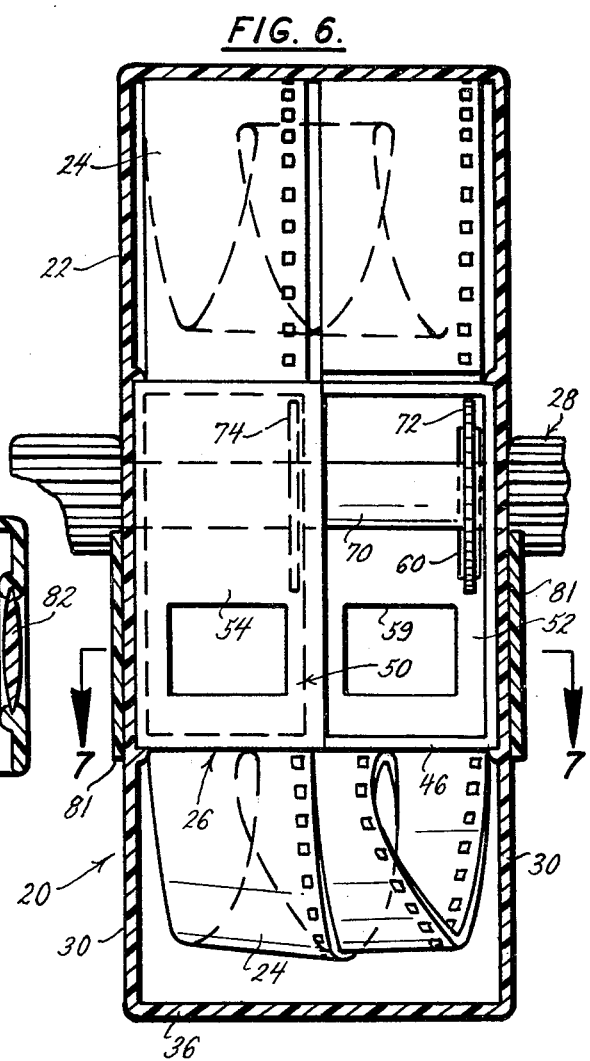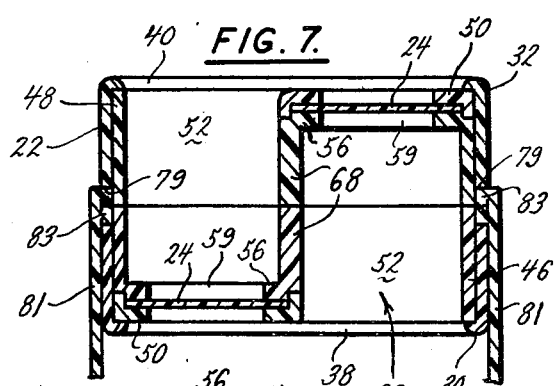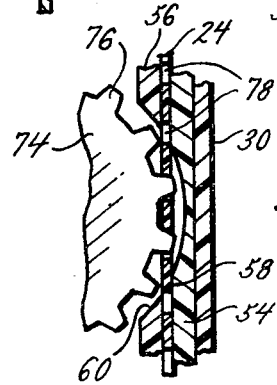

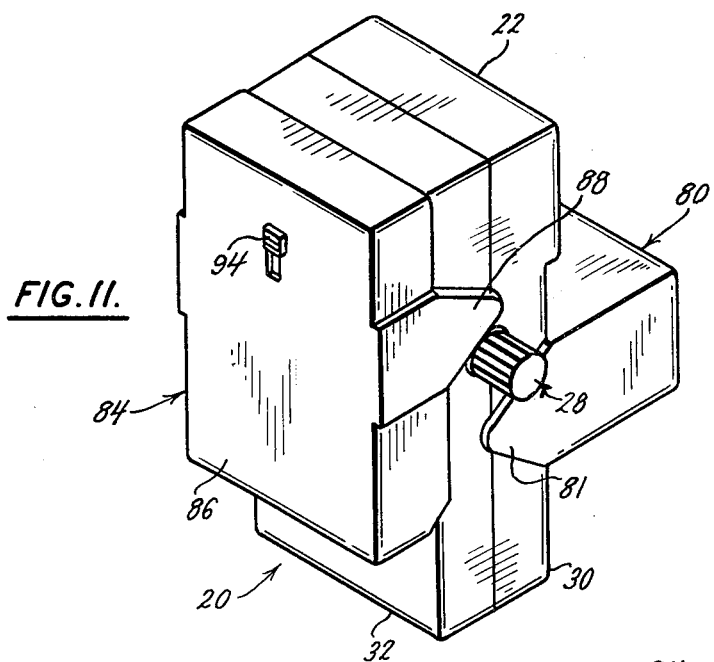
FIG. 11.
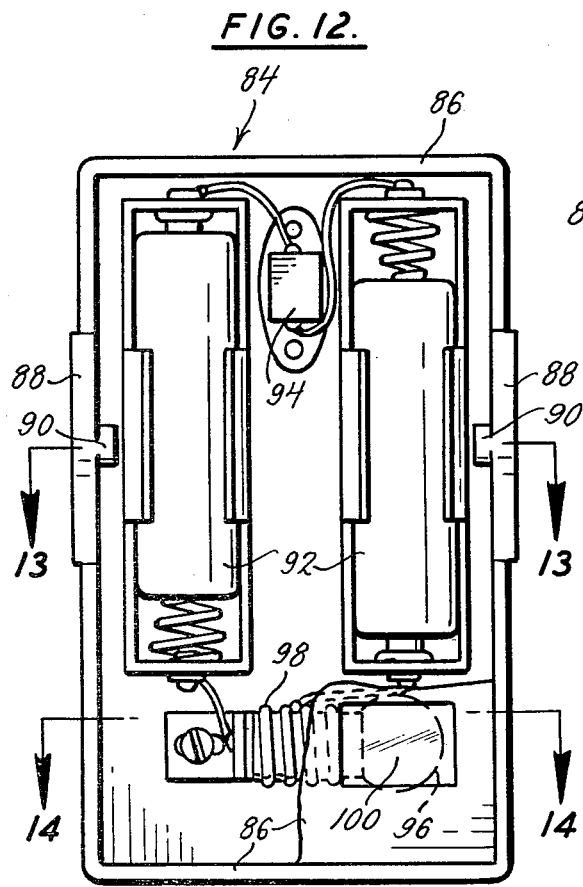
FIG. 12.
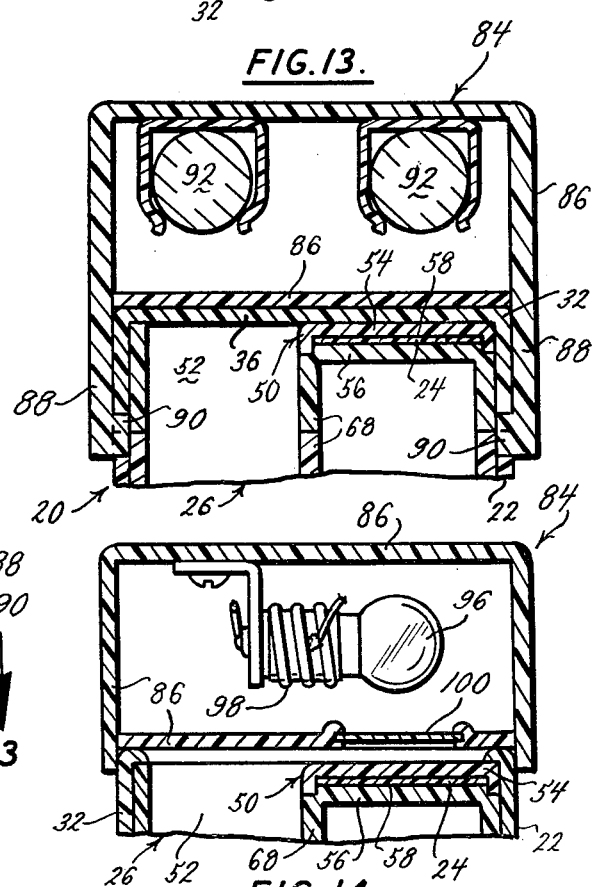
FIG. 13.
FIG. 14.

FILM CARTRIDGE

BACKGROUND AND SUMMARY

There are many various structures for the packaging of film in cartridges for both storage and to protect the film during use. Most of these structures enclose a continuous loop of film and provide some sort of sprocket to drive the film and a take up reel or reels with structure to guide the film inside the cartridge to avoid fouling. Some cartridges include an aperture or viewing means for the film and the film is guided by the aperture in a relatively flat orientation to ensure a sharp and clear image. Most cartridge structures also include some sort of mirror or glass prism to reflect the light from its point of entry through the film and out the aperture. An indirect path is normally required as the interior structure of the cassette prohibits the use of a direct or straight line light path.

If the cartridge structure provides an aperture, the film is presented either oriented for direct viewing or oriented for projection, but not in both orientations. The cartridge is usually designed with a specific application in mind and the structure included in the interior of the cartridge limits the ways in which the film may be routed and displayed at an aperture. In addition, structure in normally included within the cartridge for guiding the endless loop of film so that it does not foul at higher speeds of operation. This is especially important when the cartridges are used in motion picture films which are operated at higher speeds than film strips or slides.

Most cartridges are sealed after they are loaded with a loop of film and are not intended to be later re-opened for changing the film or the like. In fact, most cartridge structures are not capable of being loaded or unloaded without additional tools due to the complicated internal guides and mechanisms required to keep the film on track. While this may be an advantage, there are also times when it would be desirable to allow the owner of the cartridge to change the film contained therein. Unfortunately, most cartridges are not provided with this feature.

Another limitation that most cartridges have is that they require the use of additional structure to either view the film inside the cartridge or to project the film, depending upon the intended purpose of the cartridge. This both increases the cost to view or project the film and limits the versatility of the film once it is packaged inside any particular structure.

As is evident from the above, there is a great need for a film cartridge which will eliminate or solve these problems as well as provide additional features which were heretofore unavailable in the prior art. Applicant has developed a film cassette which satisfies this need. Applicant's cassette is suitable for storing and displaying a continuous loop of film for use either with a direct viewer or in a project mode of operation. The cassette consists essentially of a housing which has apertures extending the full width of the housing on opposing sides thereof which are aligned to provide a direct, straight line path for light during either the direct view mode or the project mode. It should be noted that a mirror or prism could be provided in applicant's cassette as the interior structure would not interfere with such an arrangement. Windows may be provided to seal the apertures and prevent the film and cassette interior from becoming contaminated.

The housing contains a dual film gate assembly which has slots on opposing sides for routing the film from one end of the cassette to the other. There are snap on front plates provided to hold the film against the back plates and which outline and define approximately a frame of the film for display to the aperture. A double sprocket drive is mounted on a shaft which extends through the side of the cassette and which may have finger or thumb wheels extending outside the housing to operate the shaft manually. Any other suitable structure may be attached to the shaft for either manual or motorized operation. The double sprocket drive has means to positively engage the film adjacent the two areas where the film is displayed as an aid in positioning the film within the film gate and also to maintain the relative spacing between opposing portions of the film. Detent means may be provided to index the film advance by the double sprocket drive and accurately position a full frame before the apertures. This guarantees that a substantially larger amount of film can be looped in the top end of the cassette which has a deeper interior than the bottom end of the cassette. The double sprocket also helps avoid fouling of the film during operation. The positive engaging structure may consist of a spoked sprocket and film having sprocket holes or any other method suitable for positively engaging the film. The film is easily loaded into the cassette by first forming an endless loop of film, threading the film through both sides of the dual film gate assembly, snapping on the front plates to capture the film within the film gates, aligning the film so that a substantially greater portion of the continuous loop is formed at the top, and then inserting the film into the housing which may then be either sealed for permanent storage or merely snapped shut or closed with structure allowing re-opening for later replacement of the film.

In an alternate embodiment, the apertures may extend only half the width of each side of the cassette or approximately one full width of a frame of film. The film is threaded through similar internal structure but is displayed at only one aperture in one side of the cassette. Thus only one frame of film is displayed by the aperture at any point in time but the portion displayed may be either directly viewed or the cassette turned over for projection. This is possible because of the straight line, direct light path provided by apertures in opposing sides of the cassette which allows equal access to either side of the film without interference from optical elements or mirrors.

An integral direct viewer may be provided which permits direct viewing of the film much as in a hand held slide viewer by holding the opposite side of the cassette up against a light source and viewing the film from the front of the cassette. The thumb wheel may be used to advance the film and the complete film may be shown thereby. The direct viewer is detachable and consists essentially of an extension with a suitable optical element provided in the far wall of the extension and positioned to align with the side of the cassette having the direct view orientation presented at the nearer aperture. The direct viewer may be provided with detent or friction means for positively positioning the viewer in either the operable position or the stored position. The direct viewer may also be provided with a detachable structure to allow it to be removed completely from the cassette for operation in the project mode.

A snap on light unit may be used to provide a source of light to view the film in the direct view mode. The light unit is detachable and consists essentially of a flat rectangular housing which contains a battery pack and transformer, a switch, a bulb, and a lens which is positioned to line up with the direct view aperture when mounted on the cassette.

Thus, applicant has developed a cassette structure which is unique in providing means to contain and present a continuous loop of film in both a direct view and in a project orientation with a straight line path for light. The relatively simple structure provides many additional benefits and features over those containing more complicated structure in the prior art. Some of these include the possiblity of reloading the cassette once it has been manufactured and shipped from the factory, a direct view attachment structure which is simple and relatively inexpensive, a manual advancing means which may also be adapted for use with a motor drive, structure to ensure a flat orientation of the film at the point that it is displayed through the aperture, a positive engagement of the film as it is advanced through the cassette by means of a push-pull double sprocket drive, loose coils of film which reduce the possibility of breaking or fouling during operation, an integral light chamber which enhances the viewability of the film, and an overall structure which is relatively simple and inexpensive to manufacture as well as assemble into a fully loaded cassette.

Other features and advantages of applicant's cassette are found in the brief description of drawings and detailed description of the preferred embodiment.

BRIEF DESCRIPTION OF THE DRAWINGS

FIG. 5 is a side cross-section of the film cassette taken along line 5—5 in FIG. 1;

FIG. 6 is a front cross-section of the film cassette taken along line 6—6 in FIG. 5;

FIG. 7 is a cross-section view detailing the dual film gate assembly taken along line 7—7 in FIG. 6;

FIG. 8 is a cross-section view detailing the film advance and film gate taken along line 8—8 in FIG. 5;

FIG. 9 is a cross-section view detailing the sprocket and film slot taken along line 9—9 in FIG. 8;

FIG. 11 is a perspective view of the light unit;

FIG. 12 is a side elevation of the light unit;

FIG. 13 is a cross-sectional view detailing the light unit mounting;

FIG. 14 is a cross-sectional view detailing the light bulb and its orientation.

DETAILED DESCRIPTION OF THE PREFERRED EMBODIMENT

Figure 1:
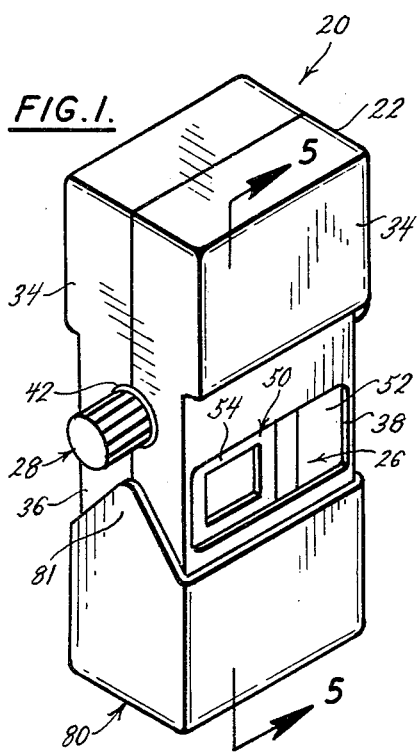
FIG. 1 is a perspective view of the film cassette.
Figure 2:
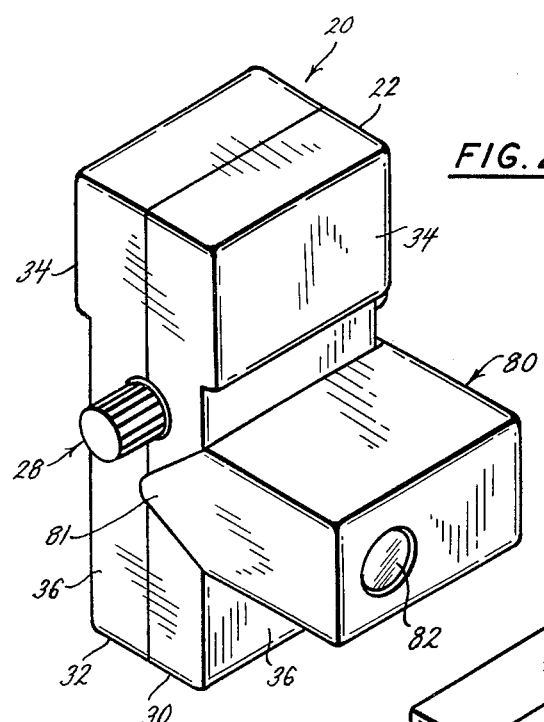
FIG. 2 is a perspective view of the film cassette with the direct viewer in the view position.
Figure 4:
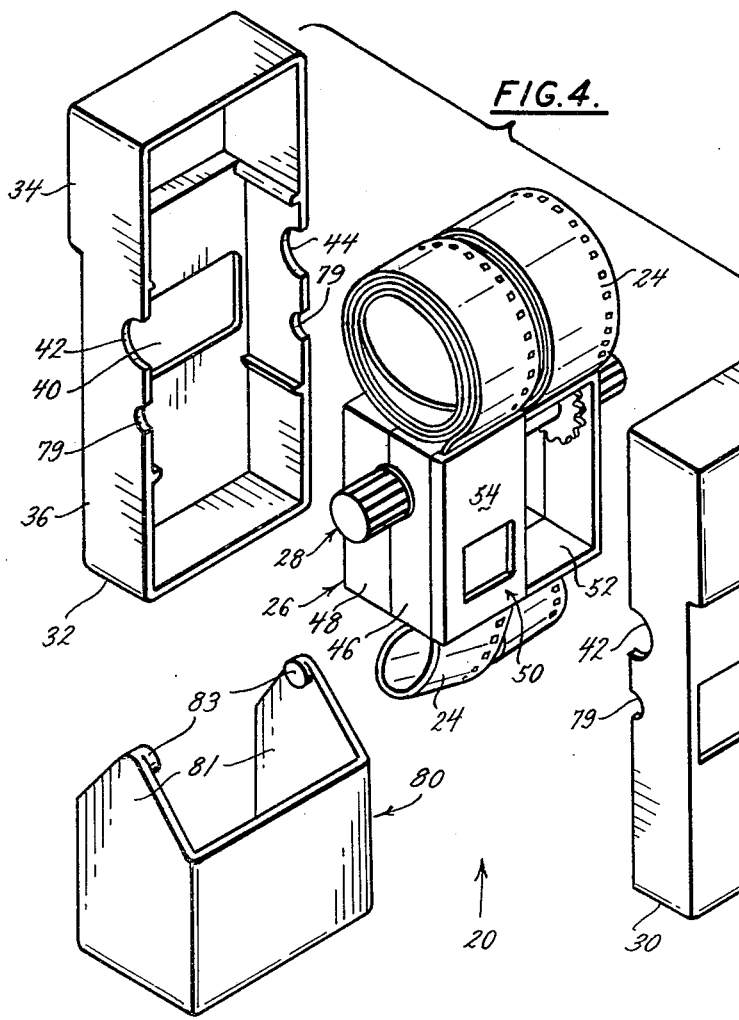
FIG. 4 is an exploded view of the film cassette.

The cassette 20 has a housing 22 which encloses the film 24, a dual film gate assembly 26 and a film advancing means 28. The housing 22 may have a top element 30 and a bottom element 32 which may be either sealed or merely snapped together to form the housing 22. In some applications, it may be desirable to provide the cassette 20 in a completely sealed configuration while in others it may be desirable to provide snap locks (not shown) or other structure as is known in the art to aid in subsequently opening the cassette 20 and changing the film 24. The housing 22 may be constructed of any high impact plastic, such as polystyrene or even lightweight metals such as aluminum which are not subject to corrosion from exposure. An end 34 of each of the housing elements 30, 32 may be provided with a somewhat greater depth than the other end 36 so that the cassette is asymmetrical to aid in identifying its correct orientation for use and also to provide extra storage area for film 24. Apertures 38, 40 formed in each of the housing elements 30, 32 extend the full width of the housing 22 and are positioned to line up with the dual film gate assembly 26 contained within the cassette 20. This arrangement provides for a straight line path for light which eliminates the need for a mirror or prism as is required in most other cartridges. It should be noted, however, that a mirror or prism could be provided in applicant's cassette, if desired, as there is no interference from the internal structure. This would permit light to be introduced from various sides, thereby increasing the cassette's flexibility. Holes 42, 44 are provided in the side of the housing elements 30, 32 to provide for operation of the film advancing means 28 from the exterior of the cassette 20.

The dual film gate assembly 26 as shown in FIG. 7, consists more particularly of a top half 46 and a bottom half 48. As the halves 46 and 48 are exactly the same, only one will be described for the purposes of illustration. Half 46 has a display side 50 and a chamber side 52 which perform different functions for different modes of operation. The display side 50 has a front plate 54 which is removably attached over the top of the bottom plate 56 to define a film gate 58. The film gate 58 maintains the film 24 in an aligned orientation while being advanced past the front plate 54 by the film advancing means 28. The front plate 54 is shaped to mask out all except the portion of each frame of film 24 that is desired to be viewed or projected. Similarly, the bottom plate 56 has an opening 59 which matches and lines up with the front plate 54 to permit light to pass through the flim gate 58. An index slot 60 is provided in the bottom plate 56 for the film advancing means 28 to extend into the film gate 58 and both position and advance the film 24 through the film gate 58. Holes 62, 64 are provided in the sides of the halves 46, 48 through which the film advancing means 28 extends. The chamber side 52 acts as a light chamber to collect and concentrate the light much as a shadow box, to aid in enhancing the viewability of the film 24 passing through the film gate of the opposite half 48. Similarly, the area 66 behind the bottom plate 56 acts in combination with the chamber side of the bottom half 48 to form a light collecting means to direct the light through the film 24 being displayed as defined by the front plate 54. A central wall 68 divides the two sides 50, 52 and prevents light entering one side from interferring with the operation of the other side.

The film advancing means 28 consists more particularly of a shaft 70 with sprockets 72, 74 mounted thereon and aligned to extend through the index slot 60 of each half 46, 48 of the bottom plates 56 as provided in the dual film gate assembly 26. The sprockets 72, 74 may have teeth 76 or other means to positively engage the sprocket holes 78 in the film 24 for positioning the film 24 and advancing it through the film gate 58 in a smooth and continuous fashion. A detent means (not shown) may be provided, if desired, to index the film with click stops or other structure as is known in the art. This would provide positive positioning of a full frame of film 24 at each of the apertures 38, 40. The shaft 70 extends through holes 62, 64 in the dual film gate assembly 26 and holes 42, 44 in the housing 22 and may have thumb wheels or any other suitable drive means extending outside the housing 22 for driving the film 24. The film 24 may be driven by hand in a manual mode or suitable structure may be provided to interface with a motor drive (not shown).

Figure 3:
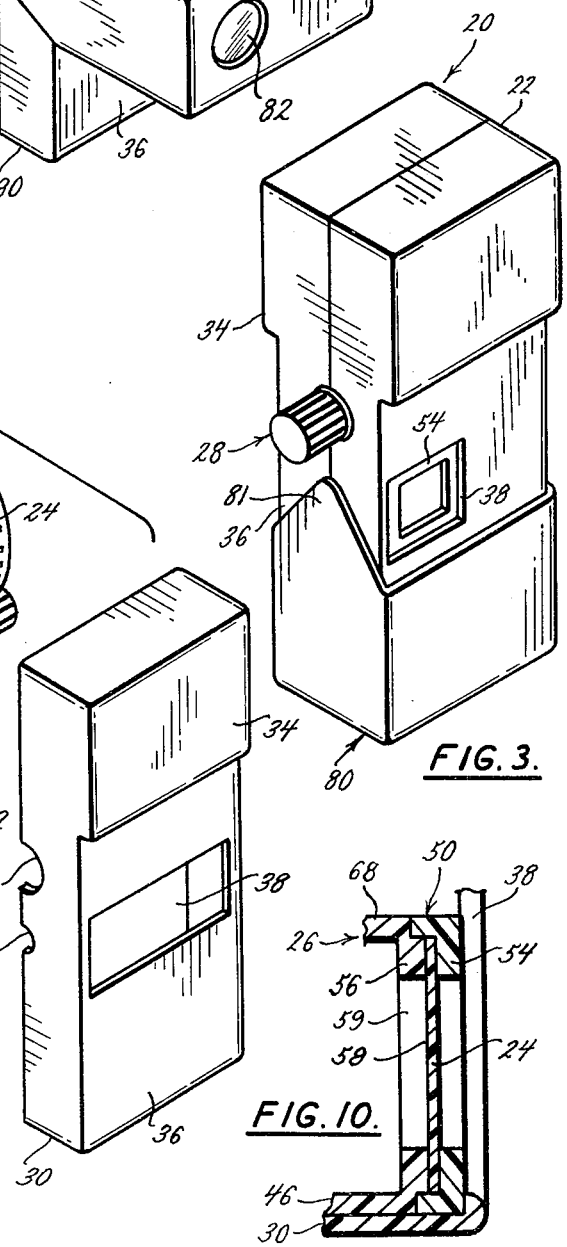
FIG. 3 is a perspective view of the alternate embodiment of the film cassette.
Figure 10:
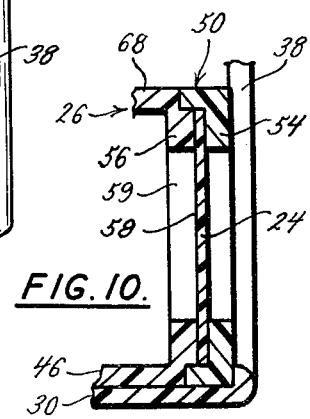
FIG. 10 is a cross-section detailing the aperture taken along line 10—10 in FIG. 5.

In an alternate embodiment as shown in FIG. 3, the apertures 38, 40 may extend only half the width of the side of the housing 22, thereby displaying only one trailer of film 24 instead of two trailers as provided by the structure of the preferred embodiment. In this embodiment, the same display may be converted from the direct view mode to the project mode by inverting the cassette 29. Similar internal structure is provided to maintain the film in a fixed orientation with respect to the apertures 38, 40 and to continuously rewind the film 24. In this embodiment, the film advancing means 28 may incorporate only one sprocket 72 which is positioned adjacent the aperture 38 where the film 24 is displayed.

Assembly of the cassette 20 and loading of the film 24 is easily accomplished. An endless or continuous loop of film 24 is formed with a larger loop at one end than at the other and with two trailers extending between the loops by which the film 24 moves from one loop to another. It should be noted that each loop is a loose coil and requires no structure for storage in the cassette. The film 24 is loaded into the dual film gate assembly 26 by removing the front plate 54 from both halves 46, 48 of the gate assembly 26, placing the trailers of film 24 within the film gates 58, and by snapping the plates 54 back onto the film guide 26 to hold the film within the film gate 58. Both trailers of film 24 should be encapsulated within the respective film gates 58 with the larger spool opposite the front plate 54 end of the dual film gate assembly 26. The film 24 and film advancing means 28 should be adjusted so as to ensure positive engagement between the sprockets 72, 74 and the sprocket holes 78 in the film. If other types of advancing means 28 are used, the other steps may be required to ensure a positive alignment between the film 24 and the film advancing means 28. After this step is completed, the dual film gate assembly 26 and the loops or spools of film 24 should be inserted into the housing 22 so that the front plate 54 aligns with the apertures 38, 40 in the sides of the housing and the shaft 70 of the film advancing means 28 aligns with holes 42, 44 in the adjacent sides of the housing 22. This alignment should place the larger spool of film 24 in the deeper end 34 of the housing 22. Once the film 24 and dual film gate assembly 26 are in position in either the top 30 or bottom 32 of the housing 22, the film advancing means 28 should be operated to ensure that the film 24 passes freely through the film gates 58 and is not pinched or obstructed by any of the interior structure of the cassette 20. Also, the alignment of the film 24 with apertures 38, 40 should be checked to ensure that the optimum portion of each frame of film 24 is exposed therethrough. After checking for visual alignment as well as mechanical alignment, the other part of the housing 22 may be snapped or sealed in place depending upon the type of cassette 20.

It should be noted that the film 24 should be aligned within the cassette 20 such that a direct view of an image which is right side up and not inverted may be seen in the display side 50 when it is nearest the aperture 38. If detent means is included, then the film 24 should be positioned so that a full frame is centered in the apertures 38, 40 in the null or index position. In this orientation, a direct view attachment 80 may be added to the cassette 20 for direct viewing of the film 24. The direct view attachment 80 consists generally of a small lens 82 and arm 81 or other structure to support the lens 82 the proper distance from the film 24 being displayed by the display side 50. The arm 81 may be removably attached to the sides of the cassette 20 at any convenient location with a pivot type of mount using pins 83 and notches 79. This allows the direct view attachment 80 to be pivoted into a viewing position and be held in place so that a viewer merely holds the cassette 20 up to any available light source and turns the thumb wheel or any other drive structure to move the film advancing means 28. If it is not desired to use the cassette 20 in the direct view mode, then the arm 81 may be pivoted down into a storage position or it may be completely detached from the cassette 20, as desired. In the alternate embodiment, the direct view attachment 80 may be installed at the opposite end of the cassette 20, depending on how the film is loaded.

A snap on light unit 84 may be provided to supply a source of light for the direct view mode which allows the user to hold the cassette 20 in any convenient orientation while viewing the film 28. The light unit 84 may have a generally rectangular housing 86 with two arms 88 each having snap in pins 90 or other suitable structure to removably secure the light unit 84 to the cassette 20. The housing 86 may contain one or more "A" or any other convenient size batteries 92, an on-off switch 94, a bulb 96 and receptacle 98, and a lens 100. A transformer (not shown) and additional components may be provided for A-C as well as D-C operation as is known in the art. The light unit 84 snaps on to the cassette 20 and the bulb 96 provides light which may be diffused by the lens 100 into a soft but adequate light for viewing the film 28 under ambient conditions ranging from night to broad daylight. The light unit 84 may be easily detached when the cassette 20 is to be used in another mode.

For the project mode, the cassette 20 may be inserted into any suitable projector having structure to accept the applicant's cassette 20. The direct view attachment 80 should be removed before inserting the cassette 20 into the projector. The cassette 20 is inserted into the projector in an orientation which centers the project side of the film guide 26 within the beam of light being produced by the projector. The film 24 is presented to the aperture 28 in an upside down and reversed orientation in this mode as is required for projection. In this orientation, the chamber side 52 is nearest the light source and the film is opposite therefrom. The cassette 20 may be provided with physical interlocking structure (not shown) which matches and lines up with corresponding structure on the projector to ensure proper insertion and operation in the project mode. This interlocking structure could be the asymmetrical shape of the housing 22 or additional structure such as ridges or tabs fitting into slots or holes.

As is evident from the foregoing, applicant has succeeded in developing a cassette 20 containing film 24 which is presented in two different modes, one suitable for direct viewing and another suitable for projection with a straight line path for light requiring no mirrors or optics. There are other changes or modifications which may be made by one of ordinary skill in the art but which are included within the teaching of applicant's disclosure. Applicant intends that his invention be limited only by the scope of the claims appended hereto.

We claim:

1. A film cassette for containing and displaying a length of film comprising a housing, a length of film contained within said housing, aperture means in said housing, means to display the film before said aperture means in a first juxtaposition, and means to invert and reverse said film and display it before said aperture means in a second juxtaposition.

2. The device of claim 1 wherein aperture means are provided in opposing sides of the housing and aligned to allow the direct passage of light between them for illuminating the portions of film being displayed.

3. The device of claim 1 further comprising means to advance the film past the aperture means.

4. The device of claim 3 wherein the film advancing means includes sprocket means for positively engaging the film.

5. The device of claim 4 wherein the sprocket means includes a sprocket adjacent each position where the film is displayed.

6. The device of claim 5 further comprising a shaft means, wherein the sprockets are secured to said shaft means.

7. The device of claim 6 wherein the shaft means extends transversely to said aperture means and has means accessible from outside the housing for turning said shaft means to advance the film.

8. The device of claim 4 further comprising a film gate means contained in the housing, said film gate means having means cooperating with said sprocket means to align and maintain the film in a substantially flat and parallel orientation with respect to the aperture means as it is displayed.

9. The device of claim 1 further comprising a direct view means detachably secured to the housing, said direct view means having optic means alignable with the aperture means for viewing the film.

10. The device of claim 9 wherein the direct view means is pivotable from a fixed pivot point wherein the optic means is aligned with the aperture means for viewing to a point wherein the optic means is adjacent the housing.

11. The device of claim 9 further comprising a light means, said light means having means to be removably attached to the housing and aligned with the aperture means to provide light for viewing the film.

12. The device of claim 1 further comprising means covering the aperture means to protect the film and interior of the housing from contamination while admitting a substantial portion of the light impinging thereon.

13. A film cassette for containing and displaying an endless loop of film comprising a housing, an endless loop of film contained therein, aperture means in opposing sides of said housing, means to simultaneously display a first portion of the film in a first juxtaposition and a second portion of said film in a second juxtaposition before said aperture means, said apertures being aligned to provide a direct straight line path for light to illuminate both portions of the film being displayed.

14. The device of claim 13 further comprising means to advance the film past the apertures and thereby change the portions of the film being displayed.

15. The device of claim 14 wherein the advancing means includes sprocket means adjacent each aperture, said sprocket means having means contacting the film adjacent each portion being displayed to positively engage said portion.

16. The device of claim 15 wherein the sprocket means includes at least two sprockets, said sprockets being mechanically interlocked to maintain the relative spacing between the portions of the film being displayed, and further comprising a shaft means, said sprockets being fixedly secured thereto, and means accessible outside the housing for operating said shaft means to simultaneously change the portion of film being displayed at each aperture.

17. The device of claim 15 further comprising a film gate means including back plate means cooperating with the sprocket means to maintain the portion of film being displayed in a substantially flat orientation with respect to the apertures as it is advanced through the film gate means, front plate means interposed between the film and aperture to outline and define the amount of film instantaneously displayed thereby, and chamber means to aid in providing sufficient lighting conditions to display the film.

18. The device of claim 17 further comprising a direct view means detachably secured to the housing, said direct view means having optic means aligned with the film displayed in the first juxtaposition and the chamber means.

19. The device of claim 18 wherein the direct view means is pivotable from a point wherein the optic means is aligned with the aperture means for viewing to a point wherein the optic means is adjacent the housing.

20. The device of claim 18 further comprising a light means, said light means having means to be removably secured to the housing and aligned with the aperture means to provide light for viewing the film.

21. The device of claim 17 wherein the front plate means is removably attached to the film gate means and the film is threaded between the front plate means and the gate.

22. The device of claim 13 wherein the housing has means to indicate proper orientation for insertion of the cassette into a projector or viewing means.

23. A film cassette for containing and displaying a continuous loop of film comprising a housing, a continuous loop of film, said housing having means to contain a larger portion of the film in one end, aperture means in opposing sides of said housing extending approximately twice the width of the film in each side and aligned to define a substantially straight line path through the housing for light impinging on either aperture, means to display a first portion of the film in a first juxtaposition and a second portion of the film in a second juxtaposition, film gate means in said housing to maintain the film in proper alignment with the aperture means as it is displayed, said film gate means having at least two back plates to provide a base for supporting the film, front plate means removably secured to each of the back plates to define a film gate through which the film extends, each front plate means and back plate means having means defining an area of film to be displayed through the aperture means, the film gate means having walls defining a chamber to enhance the viewability of the film, film advancing means including a shaft and at least two sprockets secured thereto, means defining an index slot in each back plate through which a sprocket extends to engage the film in the film gate, means defining holes in the film gate means and the housing to rotatably support the shaft, means accessible from outside the housing to rotate the shaft and thereby rotate the sprockets and advance the film simultaneously through each of the film gates, and window means covering each aperture means to seal and prevent the entry of contamination into the housing interior, said window means opposite the portion of film being displayed in the first juxtaposition having means to diffuse the light passing therethrough to enhance the viewing of images thereon, said window means in other positions transmitting a substantial portion of light impinging thereon.

24. A film cassette for containing and displaying a length of film comprising a housing, a length of film contained therein, a first aperture means in a side of the housing, a second aperture means in an opposing side of the housing, means to display a portion of the film before said apertures, said apertures being aligned to allow the direct passage of light between them for illumintating the portion of film being displayed, said film being thereby displayed in a first juxtaposition in the first aperture and displayed in a second juxtaposition in the second aperture, said second juxtaposition being the reverse of said first juxtaposition, means to advance the film past the apertures and thereby change the portion of film being displayed, film gate means including back plate means to maintain the portion of film being displayed in a substantially flat orientation with respect to the aperture as it is advanced through the film gate means, front plate means interposed between the film and one of said apertures to outline and define the amount of film instantaneously displayed thereby, and chamber means to aid in providing sufficient lighting conditions to display the film.

25. The device of claim 24 wherein the film is formed into a continuous loop and the advancing means has means to rewind the film as it advances the film past the apertures.

26. The device of claim 25, wherein the advancing means includes sprocket means, said sprocket means having means contacting the film adjacent the portion being displayed to positively engage said portion.

27. The device of claim 26 wherein the film has at least two loops and the sprocket means includes means contacting the film in both loops to positively drive the film in both loops.

28. The device of claim 24 wherein the advancing means may be operated to drive the film in the forward or reverse direction.

* * * * *